Oct. 25, 1960 R. F. KNIGHT 2,957,346
DRILLING RATE MEASURING APPARATUS
Filed Nov. 14, 1957

INVENTOR
ROBERT F. KNIGHT
BY
Curtis, Morris & Safford
ATTORNEYS

United States Patent Office 2,957,346
Patented Oct. 25, 1960

2,957,346

DRILLING RATE MEASURING APPARATUS

Robert F. Knight, Irving, Tex., assignor to Core Laboratories, Inc., Dallas, Tex., a corporation of Delaware Filed Nov. 14, 1957, Ser. No. 696,519

4 Claims. (Cl. 73—151.5)

This invention relates to apparatus for measuring the rate of penetration of a drilling tool, for example in the drilling of an oil or gas well.

In the drilling of such a well, it is customary to make a log of the drilling rate, usually in terms of the number of minutes required to drill each foot of bore hole. Such a log is useful in several ways. For example, since a change in the drilling rate usually indicates a change in the lithology of the formations being traversed by the drill bit, the drilling rate logs of adjacent wells may be correlated to aid in identifying these formations, or in mapping their contours. An increase in the drilling rate (that is a decrease in the number of minutes required to drill a foot) usually indicates an increase in the porosity of the formation. Particularly when such an increase in the drilling rate is accompanied by "lost circulation" (that is, a decrease in the volume of mud fluid returning to the surface as compared to the volume pumped down into the bore hole, indicating a probable increase in the permeability of the formation being drilled), the driller will usually stop drilling and "circulate out" (that is, continue pumping mud into and out of the well until the entrained cuttings and formation fluids from the horizon most recently drilled reach the surface and can be examined). If this examination of the cuttings and mud indicates the presence of appreciable quantities of oil or gas, the driller will probably wish to take core samples of the formation for more exhaustive testing to determine whether the formation is commercially productive.

The present invention provides apparatus for making a continuous graphic log of the drilling rate, the apparatus being accurate and reliable and yet comparatively simple and inexpensive in construction and readily susceptible of use in conjunction with conventional drilling rigs.

Figure 1:
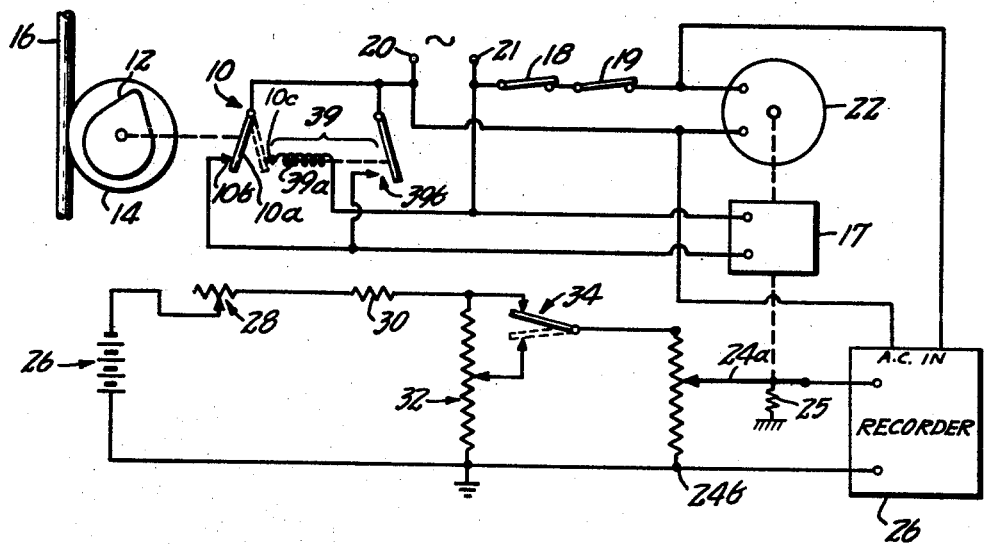
Figure 1 is a schematic diagram of the electrical circuit of a drilling rate measuring apparatus embodying features of the present invention.

The apparatus shown in Figure 1 may be used in conjunction with a depth measuring switch of the type disclosed in the copending application of Robert F. Knight, Serial No. 629,581, filed December 20, 1956, now Patent No. 2,860,417. Such a switch, which is schematically indicated in Figure 1 by the reference numeral 10, is actuated by a cam 12 fixed on the same shaft as a wheel 14 which rides on one of the strands of cable 16 which extends between the crown block and the traveling block of the drilling rig and which moves proportionately to the movement of the drill bit, as more fully disclosed in the aforesaid copending application. The wheel 14 and cam 12 make one revolution for each increment of movement of the drill bit and the switch 10 is actuated by the cam 12 once each revolution of the cam.

The depth measuring switch 10 is a single-pole double-throw switch, the movable contact 10a of which is connected to one terminal 20 of a source of electrical power. The normally closed fixed contact 10b of switch 10 is connected to one terminal of an electrically controlled clutch 17, the other terminal of the clutch 17 being connected to the other terminal 21 of the power source. The clutch 17 coupled an electric motor 22 to the rotary wiping contact 24a of a potentiometer 24.

The motor 22 is connected across the power terminals 20 and 21, through a dead-line switch 18 and an off-bottom switch 19 of the type disclosed in the aforesaid copending application, so that the motor 22 runs only when the drill bit is on bottom. Thus, the apparatus records only those vertical movements of the hoisting cable which result from a deepening of the bore hole and not those which are made for the purpose of adding a joint of drill pipe or during the making of a "round-trip."

Whenever the clutch 17 is disengaged, the wiper contact 24a is maintained in its starting position at the lower end 24b of the resistance winding of the potentiometer 24, corresponding to the minimum resistance setting, by means of a return spring 25. During drilling, the motor 22 will run continually, and the depth measuring switch 10 will normally be in the position shown in full lines in Figure 1, to supply current from the power source to the clutch 17, engaging the clutch and causing the motor 22 to drive the wiper 24a of the potentiometer 24 upwardly in the direction of increasing resistance settings. Each time the switch 10 is actuated, the supply of current to the clutch 17 will be cut off, disengaging the clutch and permitting the return spring 25 to move the wiper 24a quickly back to the minimum resistance setting at the lower end 24b of the winding of the potentiometer 24.

An adjustable D.C. voltage is applied across the potentiometer 24 by means of a battery 26 through a calibrating potentiometer 28, a dropping resistor 30, and a scale selector switch 34. A voltage dividing potentiometer 32 is also connected into the circuit between the battery 26 and potentiometer 24 when the scale-selector switch 34 is thrown from the position shown in full lines to that shown in broken lines, to reduce the voltage applied across the potentiometer 24 and change the calibration of the unit to a different scale. The wiper contact 24a and the end 24b of the winding of the potentiometer 24 are respectively connected across the signal input of a voltage recorder 26. The power input of the recorder is connected in parallel with the motor 22, so that the chart of the recorder is driven only during drilling.

Figure 3:
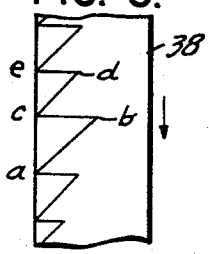
Figure 3 is an idealized representation of a typical chart produced by the apparatus as shown in Figure 1.

To describe the operation of the equipment, assume that drilling is proceeding and that the depth has just reached an integral number of feet, so that the depth measuring switch 10 has been actuated by the cam 12, breaking the circuit to the clutch 17 and permitting the spring 25 to return the wiper 24a to the lower end 24b of the winding of the potentiometer 24. The voltage at the input of the recorder 26 will instantaneously be zero and the pen of the recorder will accordingly be at the extreme left or base line of the recorder chart, as represented, for example, by the point a in Figure 3.

As soon as the measuring switch 10 is released, the clutch 17 will re-engage, causing the motor 22 to drive the wiper 24a of the potentiometer 24 in the direction of increasing resistance. As the wiper 24a moves up from the minimum resistance end 24b of the winding of the potentiometer 24, the voltage impressed across the terminals of the recorder 36 increases in a linear fashion, causing a corresponding movement to the right of the pen of the recorder chart 38. Since the chart is simultaneously moving at a uniform speed in the direction indicated by the arrow in Figure 3, the pen will trace on the chart the oblique line *ab*.

When an additional foot has been drilled, the movement of the cable 16 (Figure 1) will have rotated the roller 14 one revolution, bringing the high point of the cam 12 opposite the switch 10, again actuating the switch and breaking the circuit to the clutch 17. This will permit the return spring 25 to return the wiper 24*a* of the potentiometer immediately to the minimum resistance end 24*b* of the winding of the potentiometer. The resulting reduction to zero of the voltage at the input of the recorder 36 will cause the pen to move instantly to the point *c* on the base line of the chart 38, thus completing the sawtooth figure *abc*.

During the next foot of drilling, the figure *cde* will be traced, and so on. The altitudes of these figures traced on the chart 38 (represented by the lines *bc* and *de*) are proportional to the length of time required to drill the foot of bore hole which they respectively represent.

Since the motor 22 drives the wiper arm 24*a* at a constant angular rate and since the winding of the potentiometer 24 has a linear resistance taper, the calibration of the chart 38 is linear and it may be provided with a series of equally spaced calibration lines so that the drilling time in minues per foot may be read directly from the chart. These calibration lines may be marked with two scales of numerals respectively corresponding to the two settings of the scale selector switch 34 (for example, representing full-scale readings of 10 minutes per foot and 100 minutes per foot).

When either the dead-line switch 18 or the off-bottom switch 19 is opened, indicating that the drill bit is not resting on bottom, the power circuit to both the motor 22 and the recorder 26 is broken, suspending operation of the equipment. However, the clutch 17 will remain engaged and the wiper arm 24*a* of the potentiometer will be held in fixed position until drilling is resumed. Thus, the chart produced by the recorder will not be affected by the interruption of drilling.

In drilling through hard formations, the drilling may proceed so slowly that the depth measuring switch 10 is held in the actuated position shown in broken lines for a substantial period of time. To limit the time the clutch 17 is disengaged and insure that the potentiometer 24 is being driven during substantially the entire time of drilling, a time-delay relay 39 is provided. The winding 39*a* of this relay is connected between the other fixed contact 10*c* of switch 10 and terminal 21 of the power source. The normally open contacts 39*b* of relay 39 are connected in parallel with contacts 10*a* and 10*b* of switch 10. Thus, each time the switch 10 is actuated to the position shown in broken lines, to disengage clutch 17, the winding of relay 39 is energized. After a predetermined delay interval, for example one second, the contacts of relay 39 are closed to re-engage clutch 17, even though switch 10 may remain actuated for a considerably longer period.

Figure 2:
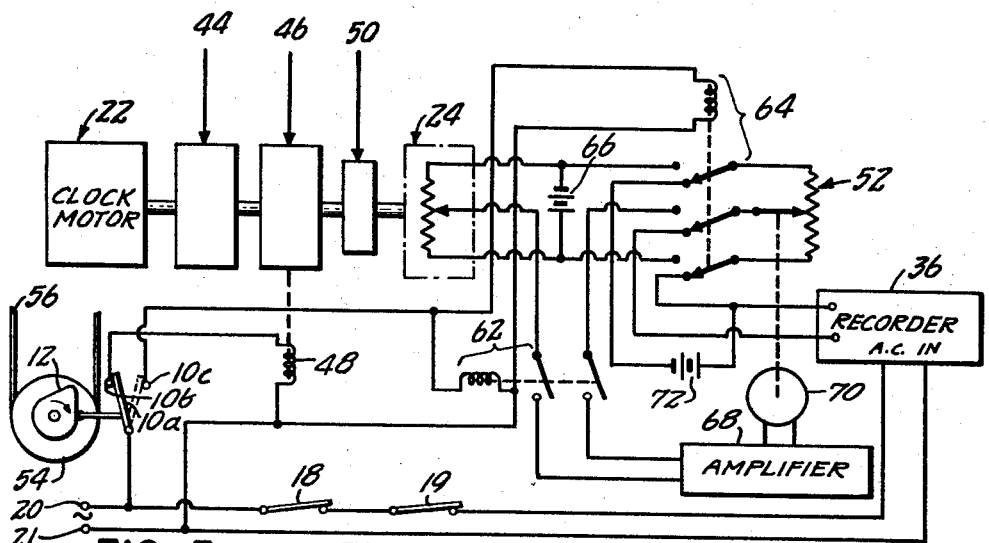
Figure 2 is a schematic diagram of the electrical circuit of an alternative type of drilling rate measuring apparatus within the scope of the invention.
Figure 4:
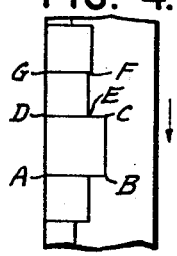
Figure 4 is an idealized representation of a typical chart produced by the apparatus shown in Figure 2.

Figure 2 is an alternative construction of apparatus whereby a chart of the type illustrated in Figure 4 may be traced. In general terms, its principle of operation is similar to that of the apparaus shown in Figure 1. It includes a continuously running synchronous motor 22 which drives a potentiometer 24 through a gear train 44 which provides for two selectable gear ratios, one corresponding to a calibration of 100 minutes per foot. An electrically controlled clutch 46 is also interposed between the motor 22 and potentiometer 24, this clutch 46 being controlled by a solenoid 48. A return spring 50 returns the rotary wiping contact 24*a* of the potentiometer 24 to the minimum resistance setting each time the solenoid 48 is deenergized to disengage the clutch 46.

The cam 12 which actuates the depth measuring switch 10 is fixed on the same shaft as a drum 54 around which is wound a small counter-weighted cable 56, one end of which is connected to the Kelly swivel, so that the drum 54 and cam 12 make one revolution and actuate the switch 10 once for each unit of movement of the drill stem. The movable contact 10*a* of switch 10 is connected to one terminal 20 of an electrical power source. This movable contact 10*a* is normally in engagement with a fixed contact 10*b* which is connected to one end of the winding of the solenoid 48 which controls the clutch 46, the other end of this winding being connected to other terminal 21 of the power source. Thus, the solenoid 48 is normally energized to engage the clutch 46 and cause the clock motor 22 to drive the wiper arm 24*a* of the potentiometer 24 at a constant rate. Upon completion of each foot of drilling, the cam 12 throws the movable contact 10*a* of switch 10 out of engagement with the fixed contact 10*b* and into engagement with the other fixed contact 10*c*. This fixed contact 10*c* is connected to one end of the windings of each of a pair of relays 62 and 64 the other ends of these windings being connected to terminal 21 of the power source. Thus the actuation of the switch 10 deenergizes solenoid 48 and energizes relays 62 and 64.

Solenoid 48 is of the delayed-deenergization type, its armature remaining in the energized position for a period of approximately one second after actuation of the switch 10. Relays 62 and 64 are of the delayed-break type, their movable contacts remaining in the energized position for a period of approximately one second after the energizing voltage is removed.

The energization of the relay 64 connects the resistance winding of the potentiometer 24 in parallel with that of a "balancing" potentiometer 52 across a D.C. voltage source, such as a battery 66. The simultaneous energization of the relay 62 connects the wiping contacts of these two potentiometers to the input terminals of an amplifier 68 which controls a motor 70 which drives the wiper of the balancing potentiometer 52. The two potentiometers form a bridge circuit, and the D.C. voltage impressed across the input terminals of the amplifier 68 is proportional to the difference in resistance settings of the two potentiometers 24 and 52. This voltage is of such polarity as to cause the motor 70 to drive the wiper of the balancing potentiometer 52 in the direction which produces a reduction of the voltage differential between the wipers of the two potentiometers. Thus, the wiper of the potentiometer 52 will be driven to the point where its position corresponds to that of the wiper of the potentiometer 24, at which point the voltage appearing at the input of the amplifier 68 will be zero and the motor 70 will automatically stop. All of this will take place during the one-second interval when relays 62 and 64 are engaged, and while solenoid 48 is still engaged.

At the end of this interval, solenoid 48 is deenergized, disengaging clutch 46 and permitting spring 50 to return the wiper arm 24*a* of potentiometer 24 to the minimum resistance setting. Simultaneously, relays 62 and 64 will move to their deenergized positions, disconnecting the amplifier 68 from the circuit and connecting the wiper arm and one end of the potentiometer 52 to the input terminals of the recorder 36 while applying a voltage from a D.C. source, such as a battery 72, across the entire winding of the potentiometer 52. Thus, the voltage applied at the input of the recorder 36 is proportional to the resistance setting of the potentiometer 52, which in turn is proportional to the former resistance setting of the potentiometer 24. Thus the pen of the recorder 36 will be deflected to the right from the point A in Figure 4 to the point B, a distance proportional to the length of time required to drill the preceding foot.

During the drilling of the next foot, while the chart continues its movement in the direction indicated by the arrow in Figure 4, the voltage applied to the input of the recorder will remain constant, since the setting of the potentiometer 52 is unchanged during this interval. Thus, the recorder pen will trace on the moving chart the straight line BC.

During the drilling of this succeeding foot, the motor 22 will have been driving the potentiometer 24 at a uniform rate. At the conclusion of drillng of this foot, the cam 12 will again actuate the switch 56, reenergizing the relays 62 and 64. This will temporarily disconnect the recorder 36 and allow its pen to return to the base line, tracing the line CD. Potentiometer 52 will be connected in parallel with the potentiometer 24 in a bridge circuit as before, with the voltage appearing across the wipers of the potentiometers 24 and 52 being used to drive the motor 70 through the amplifier 68 to re-balance the settings of the two potentiometers. Then, when the relays 62 and 64 are deenergized, the voltage on the wiper of the potentiometer 52 will be applied to the recorder 36, deflecting its pen to the point E on the chart 38 (Figure 4) a distance proportional to the length of time required to drill this second foot. Thus, the chart consists of a series of rectilinear figures ABCD, and DEFG, etc., whose heights AB and DE above the baseline are proportional to the lengths of time required to drill the feet to which they respectively correspond.

From the foregoing description, it will be seen that the present invention provides a practical apparatus which makes a permanent recording of the rate of penetration of the drilling tool. However, it should be emphasized that the particular embodiments of the invention which are described herein and shown in the accompanying drawings are intended as merely illustrative of the principles of the invention rather than as restrictive of the scope thereof or of the coverage of this patient, which is limited only by the appended claims.

What is claimed is:

1. Apparatus for measuring the rate of penetration of a drilling tool supported by drill stem hoisting tackle, said apparatus comprising a linear potentiometer, a spring coupled to the wiper arm of said potentiometer to urge the same toward a uniform starting position corresponding to a low resistance setting, an electric motor, an electrically controlled clutch coupled to said motor and to the wiper arm of said potentiometer to cause said motor to drive the wiper arm of said potentiometer from said starting position at a uniform angular speed, a switch, means responsive to the movement of said drill stem hoisting tackle for actuating said switch once each unit of depth of penetration of said drilling tool, said switch being connected to control said clutch for disengaging the same momentarily upon each actuation of said switch to permit said spring to return the wiper arm of said potentiometer to said starting position, and electrical measuring and recording means for measuring the setting of said potentiometer and making a continuous record of the same on a moving chart.

2. Apparatus for measuring the rate of penetration of a drilling tool supported by drill stem hoisting tackle, said apparatus comprising a first potentiometer, a first electric motor coupled to the wiper arm of said first potentiometer to drive the same at a uniform angular speed from a fixed starting position corresponding to a minimum resistance setting, a switch, means responsive to the movement of said drill stem hoisting tackle for actuating said switch once each unit of depth of penetration of said drilling tool, time delay means for connecting said switch to control the driving of said first potentiometer by said switch to stop the driving thereof a short time interval after each actuation of said switch, a spring coupled to the wiper arm of said first potentiometer to drive the same to said starting position each time the driving of the same by said first motor is stopped, a second potentiometer, a second motor coupled to the wiper arm of said second potentiometer, a recorder, a control circuit for said second motor, relay means controlled by said switch, said relay means being arranged, each time said switch is actuated, to connect said second potentiometer in parallel with said first potentiometer across a voltage source for a time not less than said interval and at the same time to connect the wiper arms of said potentiometers to said control circuit to cause said second motor to drive the wiper arm of said second potentiometer to a voltage setting equal to that of said first potentiometer and stop, and, in the interval between such actuations, to connect the wiper arm and one terminal of said second potentiometer to said recorder.

3. Apparatus for measuring the rate of penetration of a drilling tool supported by drill stem hoisting tackle, said apparatus comprising a linear potentiometer, a spring coupled to the wiper arm of said potentiometer to urge the same toward a uniform starting position corresponding to a low resistance setting, an electric motor, an electrically controlled clutch coupled to said motor and to the wiper arm of said potentiometer to cause said motor to drive the wiper arm of said potentiometer from said starting position at a uniform angular speed, a switch, means responsive to the movement of said drill stem hoisting tackle for actuating said switch once each unit of depth of penetration of said drilling tool, said switch being connected to control said clutch for disengaging the same momentarily upon each actuation of said switch to permit said spring to return the wiper arm of said potentiometer to said starting position, a time-delay relay connected to be controlled by said switch and having its contacts connected to control said clutch whereby said relay causes said clutch to be re-engaged a predetermined time interval after each actuation of said switch, and electrical measuring and recording means for measuring the setting of said potentiometer and making a continuous record of the same on a moving chart.

4. Apparatus for measuring the rate of penetration of a drilling tool supported by drill stem hoisting tackle, said apparatus comprising a linear potentiometer, a spring coupled to the wiper arm of said potentiometer to urge the same toward a uniform starting position corresponding to a low resistance setting, an electric motor, an electrically controlled clutch coupled to said motor and to the wiper arm of said potentiometer to cause said motor to drive the wiper arm of said potentiometer from said starting position at a uniform angular speed, a switch, means responsive to the movement of said drill stem hoisting tackle for actuating said switch once each unit of depth of penetration of said drilling tool, said switch being connected to control said clutch for disengaging the same momentarily upon each actuation of said switch to permit said spring to return the wiper arm of said potentiometer to said starting position, a voltage source, resistance means connected to said voltage source to give at least two different voltages from said source, and a range switch for selectively connecting said voltages across said potentiometer to provide different ranges of drilling rate, and electrical measuring and recording means connected across the wiper arm and one terminal of said potentiometer for measuring the voltage appearing between them and making a continuous record of the same on a moving chart.

References Cited in the file of this patent

UNITED STATES PATENTS

| | | |
|---|---|---|
| 2,365,014 | Silverman et al. | Dec. 12, 1944 |
| 2,390,178 | Rutherford | Dec. 4, 1945 |